(12) United States Patent
Radkov et al.

(10) Patent No.: US 8,519,611 B2
(45) Date of Patent: Aug. 27, 2013

(54) HYBRID ILLUMINATION SYSTEM WITH IMPROVED COLOR QUALITY

(75) Inventors: Emil Radkov, Euclid, OH (US); Anant Setlur, Niskayuna, NY (US); Srinath Aanegola, Broadview Heights, OH (US)

(73) Assignee: GE Lighting Solutions, LLC, Cleveland, OH (US)

( * ) Notice: Subject to any disclaimer, the term of this patent is extended or adjusted under 35 U.S.C. 154(b) by 287 days.

(21) Appl. No.: 12/353,455

(22) Filed: Jan. 14, 2009

(65) Prior Publication Data

US 2010/0177513 A1 Jul. 15, 2010

(51) Int. Cl.
*F21K 2/00* (2006.01)
*C09K 11/00* (2006.01)
*H01J 1/62* (2006.01)

(52) U.S. Cl.
USPC ............... 313/503; 252/301.4 F; 252/301.4 R (58) Field of Classification Search
USPC .................. 313/501–503, 498; 252/301.4 F, 252/301.4 R, 301.4 H
See application file for complete search history.

(56) References Cited

U.S. PATENT DOCUMENTS

| | | |
|---|---|---|
| 6,234,648 B1 | 5/2001 | Börner et al. |
| 6,513,949 B1 | 2/2003 | Marshall et al. |
| 6,555,958 B1 * | 4/2003 | Srivastava et al. ............ 313/506 |
| 6,577,073 B2 | 6/2003 | Shimizu et al. |
| 7,575,697 B2 * | 8/2009 | Li et al. .................... 252/301.4 F |
| 2006/0138435 A1 * | 6/2006 | Tarsa et al. ...................... 257/89 |
| 2006/0285324 A1 | 12/2006 | Ansems et al. |
| 2007/0139920 A1 | 6/2007 | Van De Ven et al. |
| 2007/0223219 A1 * | 9/2007 | Medendorp et al. .......... 362/231 |
| 2009/0152572 A1 * | 6/2009 | Su et al. ........................... 257/89 |
| 2009/0174310 A1 * | 7/2009 | Vogt et al. ..................... 313/503 |

* cited by examiner

*Primary Examiner* — Karabi Guharay
(74) *Attorney, Agent, or Firm* — Fay Sharpe LLP (57) ABSTRACT

A white light hybrid illumination system including an amber LED, a red LED, and a phosphor converted LED such as a blue LED chip and a green phosphor, wherein a peak emission difference between the amber and red LED is at least 25 nm. This system provides higher color quality than prior devices due to its high luminous efficacy, high CRI over a wide CCT range, and better color control.

11 Claims, 8 Drawing Sheets

HYBRID ILLUMINATION SYSTEM WITH IMPROVED COLOR QUALITY

BACKGROUND

This invention relates to the illumination arts. More particularly, this invention relates to a light emitting system incorporating a plurality of light emitting diodes (LEDs) or laser diodes (LDs) and phosphor materials, which is capable of producing visible white or colored light having a desired light distribution pattern.

A color-mixing lighting system is known from U.S. Pat. No. 6,234,648. The known color-mixing lighting system comprises at least two light emitting diodes each emitting, in operation, visible light in a pre-selected wavelength range. A converter converts part of the visible light emitted by one of the LEDs into visible light in a further wavelength range so as to optimize the color rendition of the lighting system. Preferably, the diodes include a blue light emitting diode and a red light emitting diode and the converter includes a luminescent material for converting a portion of the light emitted by the blue light emitting diode into green light.

It is also known to combine blue, green and red light emitting diodes (LEDs) in a color mixing system to make white light for general lighting applications. The correlated color temperature (CCT) can be set by properly tuning the power ratio of the individual LEDs. If the spectral emission band wavelength of the three LEDs is in the ranges 430-470 nm, 520-560 nm, and 590-630 nm, a color rendering index (CRI) of about 80-85 is possible. In addition, it is known that the emission spectrum of a LED typically exhibits a single, relatively narrow peak at a wavelength ("peak wavelength") determined by the structure of the light emitting diode and the composition of the materials from which the LED is constructed. This implies that combining blue, green and red LEDs to form a light source of white light limits the achievable CRI. In addition, the obtainable color rendering index is very sensitive to small wavelength variations of the LEDs.

Light emitting diodes and lasers have been produced from Group III-V alloys, such as gallium nitride (GaN). To form the LEDs, layers of GaN-based alloys are typically deposited epitaxially on a substrate, such as silicon carbide or sapphire, and may be doped with a variety of n and p-type dopants to improve properties, such as light emission efficiency. Such GaN-based LEDs generally emit light in the UV and/or blue range of the electromagnetic spectrum.

By interposing a phosphor excited by the radiation generated by the LED, light of a different wavelength, e.g., in the visible range of the spectrum, may be generated. Colored LEDs are often used in toys, indicator lights and other devices. Performance improvements have enabled new applications for LEDs of saturated colors in traffic lights, exit signs, store signs, and the like.

In addition to colored LEDs, a combination of LED generated light and phosphor generated light may be used to produce white light. The most popular white LEDs include blue emitting InGaN chips. The blue emitting chips are coated with a phosphor that converts some of the blue radiation to a complementary color, e.g. yellow. Together, the blue and yellowish radiation produces a white light. There are also white LEDs that utilize a near UV emitting chip and a phosphor blend including red, green and blue-emitting phosphors designed to convert the UV radiation to visible light.

Known white light emitting devices comprise a blue light emitting LED having a peak emission wavelength in the blue range (from about 430 nm to about 480 nm) combined with a yellow light emitting phosphor, such as cerium (III) doped yttrium aluminum garnet ("YAG:Ce"), a cerium (III) doped terbium aluminum garnet ("TAG:Ce"), or a europium (II) doped barium orthosilicate ("BOS"). The phosphor absorbs a portion of the radiation emitted from the LED and converts the absorbed radiation to a yellow light. The remainder of the blue light emitted by the LED is transmitted through the phosphor and is mixed with the yellow light emitted by the phosphor. A viewer perceives the mixture of blue and yellow light as a white light. The total of the light from the phosphor material and the LED chip provides a color point with corresponding color coordinates (x and y) and correlated color temperature (CCT), and its spectral distribution provides a color rendering capability, measured by the color rendering index (CRI).

The wavelength of the light emitted by the phosphor is dependent on the particular phosphor material used. For example, a blue absorbing, yellow emitting phosphor, such as YAG, can be used to generate yellow light. Light sources produced in this manner are suited to a wide variety of applications, including lamps, displays, back light sources, traffic signals, illuminating switches, and the like.

Other white light LED sources use different colored LED chips rather than phosphor converted LEDs. Lighting systems which use LEDs to produce white light are more efficient at the package level than lighting systems which use phosphor-LEDs. However, high quality white light is more difficult to achieve in solely LED based lighting systems. This is because LEDs manufactured to optimize total lighting system performance and production typically must be combined in an undesirably large integral number of LED chips to provide the requisite quantities of red, green and blue light when operated at full rated power. Moreover, using LEDs having a wide variety of different hues would necessitate using LEDs having a variety of different efficiencies, thereby reducing the efficiency of the system.

There are other limitations associated with solely LED based lighting systems. Existing green LEDs operating at the very desirable light spectral wavelength of about 550 nm are very inefficient. Further, currently available efficient LEDs make good color rendering difficult to achieve. Good color rendering is possible, but places constraints on specific choices of LEDs.

Additionally, mixing LEDs to produce white light adds efficiency costs. More specifically, many highly collimated mixing schemes are binary in that they mix two LEDs at a time. Solely, LED based lighting systems typically use three and four LEDs and thus, require two stages of mixing. Unfortunately, each stage of mixing has an efficiency cost which significantly lowers the performance of the system.

Thus, as alluded to earlier, there are advantages to producing white light with phosphor-LED based lighting systems as compared to solely LED based lighting systems because phosphor-LEDs do not require mixing and have lower material costs (they are inherently mixed). However, they tend to be less efficient at the package level than LED based lighting systems because of quantum deficits and cross-excitation losses.

Accordingly, there is a need for a lighting system which combines certain aspects of LED and phosphor-LED based lighting systems to achieve benefits beyond either system, including high luminous efficacy, high CRI over a wide range of CCT values, and a better color control to achieve and maintain the color point.

BRIEF SUMMARY

The present invention is directed to a white light emitting device having a first LED having a peak emission less than about 480 nm and a phosphor material radiationally coupled to the first LED; a second LED having a peak emission greater than 615 nm; and a third LED having a peak emission in the range less than 610 nm. Importantly, the peak emission of the second LED is at least 25 nm greater than the peak emission of the third LED.

Preferably, the first LED is a violet to blue emitting LED with a peak emission wavelength between about 400 and 480 nm. If so, the phosphor material can be a green emitting phosphor capable of absorbing at least a portion of the radiation emitted from said first LED and emitting light having a peak wavelength in the range of from about 480 to 560 nm. Typically, the phosphor material comprises at least one phosphor selected from the group consisting of alkaline earth aluminates, silicates or aluminosilicates doped with $Eu^{2+}$, alkaline earth oxynitrides doped with $Eu^{2+}$, alkaline earth halophosphates doped with $Eu^{2+}$, and alkaline earth haloaluminosilicates doped with $Ce^{3+}$.

In a preferred embodiment the second LED chip has a peak emission between 35 and 40 nm greater than the third LED chip and the device has a CRI of at least 80, preferably at least 90 and a luminous efficacy of at least 330 lm/Wopt, preferably greater than 350 lm/Wopt.

In a further embodiment, the white light emitting device comprises a first LED having a peak emission in the range about 400 to 480 nm and a phosphor material radiationally coupled to said first LED, said phosphor material comprising an $Eu^{2+}$ and/or $Ce^{3+}$ activated phosphor having the following composition:

$$M^{(1)}{}_a M^{(2)}{}_b M^{(3)}{}_c M^{(3')}{}_d M^{(4)}{}_e M^{(5)}{}_f L^{(1)}{}_g L^{(2)}{}_h L^{(3)}{}_i L^{(4)}{}_j$$

where $M^{(1)}$ comprises one or more monovalent cations, $M^{(2)}$ comprises one or more divalent cations that necessarily includes $Eu^{2+}$, $M^{(3)}$ comprises one or more trivalent elemental cations that can include trivalent lanthanides, $Y^{3+}$, $Sc^{3+}$, $In^{3+}$, and $Ce^{3+}$, $M^{(3')}$ comprises one or more trivalent elemental cations that can include $B^{3+}$, $Al^{3+}$, $Ga^{3+}$, $In^{3+}$; $M^{(4)}$ comprises one or more tetravalent elemental cations that can include $Si^{4+}$, $Ge^{4+}$; $M^{(5)}$ comprises one or more pentavalent elemental cations that can include $P^{5+}$; $L^{(1)}$ comprises one or more monovalent elemental anions, $L^{(2)}$ comprises one or more divalent elemental anions, $L^{(3)}$ comprises one or more trivalent elemental anions, and $L^{(4)}$ comprises one or more of tetravalent anions such as $C^{4-}$, wherein $a+b+c=1$, and $a+2b+3c+3d+4e+5f=g+2h+3i+4j$; a second LED having a peak emission in the range >615; and a third LED having a peak emission in the range <610 nm and wherein a difference between the second and third LED is at least 25 nm, preferably between 35 and 40 nm. Preferably, $0.4<(d+e+f)/(a+b+c) \leq 2.5$, $1.8 \leq h \leq 5$, $0 \leq i \leq 2.2$, $0 \leq j \leq 1$. More preferably, $M^{(2)}$ comprises of at least $Ca^{2+}$, $Sr^{2+}$, $Ba^{2+}$ and necessarily includes $Eu^{2+}$; $M^{(4)}$ comprises of at least $Si^{4+}$, $0.4 \leq (d+e+f)/(a+b+c) \leq 2.1$, $0.35 \leq e \leq 2.1$, $1.8 \leq h \leq 5$, $i=0$, $j=0$.

In a further embodiment, the white light emitting device comprises a first LED having a peak emission in the range about 400 to 480 nm and a phosphor material radiationally coupled to said first LED, said phosphor material comprising a phosphor having a general formula of $[(Sr_{1-z}M_z)_{1-(x+w)}A_w Ce_x]_3 (Al_{1-y} Si_y) O_{4+y+3(x-w)} X_{1-y-3(x-w)}$, wherein $0<x \leq 0.10$ and $0 \leq y \leq 0.5$, $0 \leq z \leq 0.5$, $0 \leq w \leq x$, A is Li, Na, K, Rb, or any combinations thereof, M is Ca, Ba, Mg, Zn, or any combinations thereof and X is a monovalent anion; a second LED having a peak emission in the range >615; and a third LED having a peak emission in the range <610 nm and wherein a difference between the second and third LED is at least 25 nm, preferably between 35 and 40 nm. Preferably, $0<x \leq 0.05$, $0.2 \leq y \leq 0.6$, $0.2 \leq z \leq 0.6$, A is Li, Na, or any combinations thereof, M is Ca, and X is F. More preferably, $0.0025 \leq x \leq 0.02$, $0.3 \leq y \leq 0.5$, $0.3 \leq z \leq 0.5$, A is Li, Na, or any combinations thereof, M is Ca, and X is F.

DESCRIPTION OF THE PREFERRED EMBODIMENTS

The color of the generated visible light is dependent on the particular components of the phosphor material. The phosphor material may include only a single phosphor composition or two or more phosphors of basic color, for example a particular mix with one or more of a yellow and red phosphor to emit a desired color (tint) of light. As used herein, the terms "phosphor" and "phosphor material" may be used to denote both a single phosphor composition as well as a blend of two or more phosphor compositions. "Radiationally coupled" means that the noted LED(s) and the phosphor material are associated with each other so that at least part of the radiation emitted from the LED(s) is transmitted to the phosphor material.

In one embodiment, a white light device is provided including at least three LED chips emitting at different peak wavelengths and a phosphor material radiationally coupled to at least one of the LEDs for providing white light.

Figure 1:
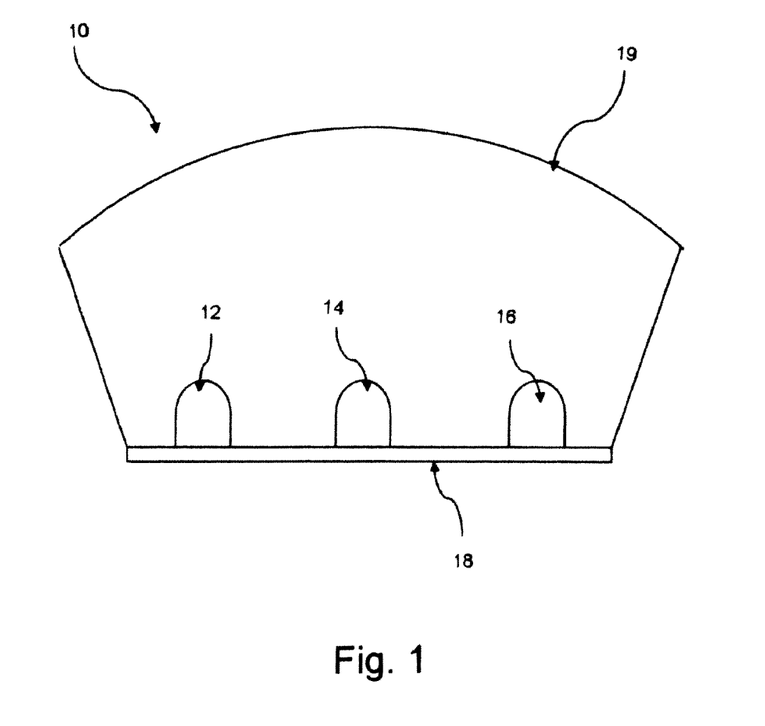
FIG. 1 is a side view of a lighting device according to one embodiment.

With reference to FIG. 1, an exemplary LED based light emitting assembly or lamp 10 is shown in accordance with one preferred structure of the present invention. The light emitting assembly 10 comprises at least three different semiconductor light sources, such as light emitting diode (LED) chips or packaged LEDs 12, 14, 16. The LEDs may be electrically attached to or mounted on a printed circuit board (PCB) 18 to provide current to the LEDs and thus cause the LEDs to emit radiation. A lens or other type of transparent cover 19 may be disposed over the lamp for mixing, focusing or simply transmitting the light emitted by the device.

The lamp includes three LED sources, all emitting at different peak wavelengths, namely in the red, amber, and blue region of the spectrum. The first LED is a violet to blue emitting LED and will have a phosphor material radiationally coupled to the LED chip to down-convert at least a portion of the radiation emitted by the chip to a longer wavelength. The preferred peak emission of the violet to blue LED chip in the present embodiments will depend on the identity of the phosphor material radiationally coupled but will generally be less than 480 nm.

As noted, the second LED is an amber emitting LED. The third LED is a red emitting LED. In a preferred embodiment, the peak emission of the red emitting LED will be greater than 615 nm, such as about 620 to 640 nm. In a preferred embodiment, the peak emission of the amber LED will be less than 610 nm such as in the range from about 580 to about 600 nm. The peak emissions of the amber and red LEDs will preferably be separated by at least 25 nm, more preferably between 35 and 40 nm.

In one embodiment, the first LED is a violet to blue emitting LED chip with a peak emission wavelength between 400 and 480 nm. In this embodiment, the LED is radiationally coupled to a green emitting phosphor that is capable of absorbing at least a portion of the radiation from the first LED and emitting light having a peak wavelength in the range of from 480 to 560 nm.

Preferably, the LEDs described herein may comprise a compound represented by the formula $In_iGa_jAl_kN$ or $In_iGa_jAl_kP$ (where $0 \leq i$; $0 \leq j$; $0 \leq k$ and $i+j+k=1$). Such LED semiconductors are known in the art. The radiation source is described herein as an LED for convenience. However, as used herein, the term "LED" is meant to encompass all semiconductor radiation sources including, e.g., semiconductor laser diodes.

Although the general discussion of the exemplary structures of the invention discussed herein are directed toward inorganic LED based light sources, it should be understood that the LEDs may be replaced by an organic light emissive structure or other radiation source unless otherwise noted and that any reference to LEDs, LED chips or semiconductors is merely representative of any appropriate radiation source. The LEDs can take various forms, such as packaged LEDs, surface mount devices ("SMD") or chip on board ("COB") design.

Figure 2:
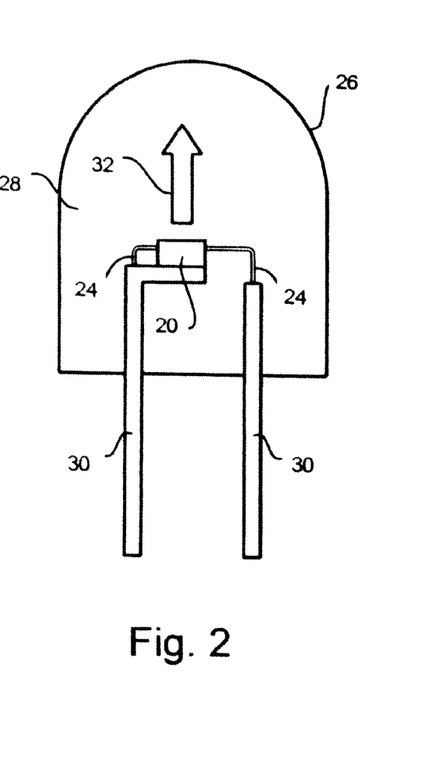
FIG. 2 is a schematic cross-sectional view of an LED suitable for use in an embodiment of the present invention.

With reference to FIG. 2, the second and third LEDs may include a chip 20, which may be enclosed in an encapsulant material 28 and includes leads 24 to attach the LED to the PCB. The LED chip 20 may be encapsulated within a shell 26, which encloses the LED chip and an encapsulant material 28. The shell 26 may be, for example, glass or plastic. Preferably, the LED chip 20 is substantially centered in the encapsulant 28. The encapsulant 28 is preferably an epoxy, plastic, low temperature glass, polymer, thermoplastic, thermoset material, resin or other type of LED encapsulating material as is known in the art. Optionally, the encapsulant is a spin-on glass or some other material having a high index of refraction. In one embodiment, the encapsulant material is a polymer material, such as epoxy, silicone, or silicone epoxy, although other organic or inorganic encapsulants may be used. Both the shell and the encapsulant are preferably transparent or substantially optically transmissive with respect to the light 32 produced by the LED chip 20. In an alternate embodiment, the LED may only include an encapsulant material without an outer shell 18. The LED chip may be supported, for example, by lead frame 30, by the self-supporting electrodes, the bottom of the shell, or by a pedestal (not shown) mounted to the shell or to the lead frame.

Figure 3:
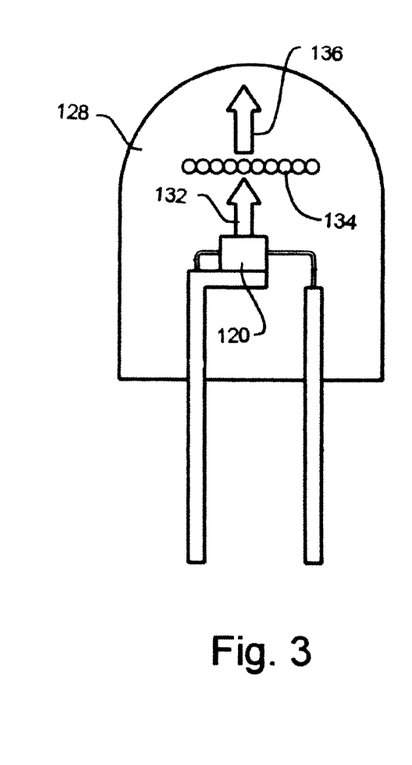
FIG. 3 is a schematic cross-sectional view of another LED suitable for use in an embodiment of the present invention.

With reference to FIG. 3, and with respect to the first LED, the structure of the LED preferably includes a phosphor material 134 radiationally coupled to the LED chip 120. This phosphor material 134 is deposited on or adjacent the LED 120 by any appropriate method. For example, a suspension of the phosphor(s) can be formed, and applied as a phosphor layer to the LED chip surface. In one such method, a silicone, epoxy or other matrix material is used (either directly or diluted with an organic solvent, e.g. acetone, MIBK or butyl acetate) to create a slurry in which the phosphor particles are randomly suspended and placed around the LED chip. This method is merely exemplary of possible positions of the phosphor material and LED chip. Thus, the phosphor material 134 may be coated over or directly on the light emitting surface of the LED chip 120 by coating and drying or curing the phosphor suspension over the LED chip (not shown).

Alternately, as shown in FIG. 3, the phosphor material 134 is interspersed within the encapsulant material 128, instead of being formed directly on the LED chip 120. The phosphor material (in the form of a powder) may be interspersed within a single region of the encapsulant material or, more preferably, throughout the entire volume of the encapsulant material. Radiation 132 emitted by the LED chip mixes with the light emitted by the phosphor material (not shown), resulting in a combined emission light 136 from the LED. If the phosphor is to be interspersed within the encapsulant material, then a phosphor powder may be added to a polymer precursor, loaded around the LED chip 120, and then the polymer precursor may be cured to solidify the polymer material. Other known phosphor interspersion methods may also be used, such as transfer molding.

Figure 4:
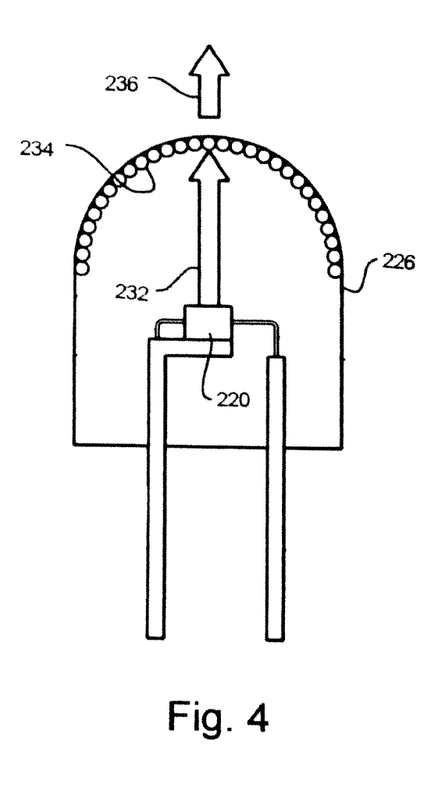
FIG. 4 is a schematic cross-sectional view of another LED suitable for use in an embodiment of the present invention.

FIG. 4 illustrates another preferred structure of the first LED according to one embodiment of the present invention. The structure of the embodiment shown in FIG. 2 is similar to that of FIG. 3, except that the phosphor material 234 is coated onto a surface of the shell 226, instead of being formed over the LED chip 220. The phosphor material is preferably coated on the inside surface of the shell 226, although the phosphor may be coated on the outside surface of the shell, if desired. The phosphor material may be coated on the entire surface of the shell or only a top portion of the surface of the shell. The radiation 232 emitted by the LED chip mixes with the light emitted by the phosphor material, and the mixed light appears as white light 236. Of course, the structures of FIGS. 2-3 may be combined and the phosphor material may be located in any or all of the locations or in any other suitable location, such as separately from the shell or integrated into the LED.

In any of the above structures, the LEDs may also include a plurality of scattering particles (not shown), which are embedded in the encapsulant material. The scattering particles may comprise, for example, $Al_2O_3$ particles (such as alumina powder) or $TiO_2$ particles. The scattering particles effectively scatter the coherent light emitted from the LED chip, preferably with a negligible amount of absorption.

Figure 5:
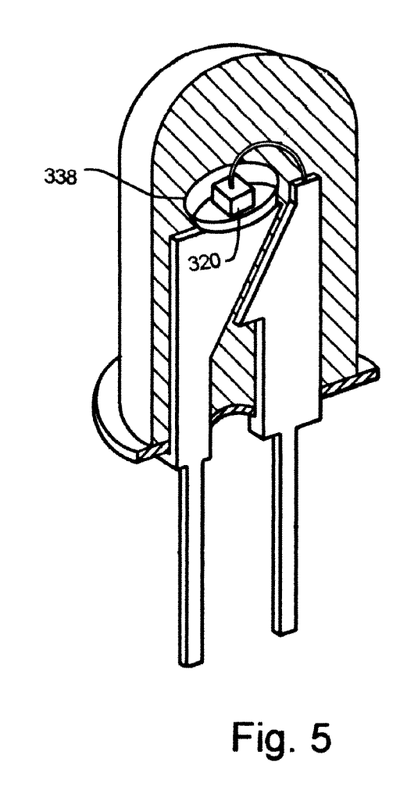
FIG. 5 is a cutaway side perspective view of another LED suitable for use in an embodiment of the present invention.

As shown in the structure of FIG. 5, the LED chip 320 in any of the first to third LEDs may be mounted in a reflective cup 338. The cup may be made from or coated with a reflective material, such as alumina, titania, or other dielectric known in the art. A preferred reflective material is $Al_2O_3$. The remainder of the structure of the embodiment of FIG. 5 may be the same as that of any of the previous FIGS. 2-4.

In one embodiment, the light emitting device has an emission consisting of the combined emissions from only a first LED having a peak emission in the range about 400-480 nm and a phosphor material radiationally coupled to said first LED, a second LED having a peak emission in the range 620-650 nm, and a third LED having a peak emission in the range 500-600 nm.

The phosphor material in the first LED is a substance which is capable of absorbing a part of the light emitted by the LEDs and emitting light of a wavelength different from that of the absorbed light. When used in a system with a first LED chip having defined emission characteristics, the phosphor material preferably will be chosen such that it can be excitable by the emission of the LED chip, i.e. have an excitation sensitivity in the wavelength range of the emitted radiation from the LED.

The composition of the phosphor material may vary depending on the desired light output from the device and the emission from the LED chip of the first LED. As noted above, the green phosphor material will have an emission with a peak ranging from about 480 nm to about 560 nm. The phosphor material may comprise one or more phosphor compositions. Although not intended to be limiting, the median particle size of the phosphor material as measured using light scattering methods or via microscope (electron or optical) measurements may be from about 1 to about 20 microns.

Although not intended to be limiting, suitable phosphors for use in the phosphor material of the present embodiments include alkaline earth aluminates, silicates or aluminosilicates doped with $Eu^{2+}$, alkaline earth oxynitrides doped with $Eu^{2+}$, alkaline earth halophosphates doped with $Eu^{2+}$, and alkaline earth haloaluminosilicates doped with $Ce^{3+}$.

Thus, in one general embodiment, the phosphor material comprises an $Eu^{2+}$ and/or $Ce^{3+}$ activated phosphor having the following composition:

where $M^{(1)}$ comprises one or more monovalent cations, $M^{(2)}$ comprises one or more divalent cations that necessarily includes $Eu^{2+}$, $M^{(3)}$ comprises one or more trivalent elemental cations that can include trivalent lanthanides, $Y^{3+}$, $Sc^{3+}$, $In^{3+}$, and $Ce^{3+}$, $M^{(3')}$ comprises one or more trivalent elemental cations that can include $B^{3+}$, $Al^{3+}$, $Ga^{3+}$, $In^{3+}$, $M^{(4)}$ comprises one or more tetravalent elemental cations that can include $Si^{4+}$, $Ge^{4+}$, $M^{(5)}$ comprises one or more pentavalent elemental cations that can include $P^{5+}$, $L^{(1)}$ comprises one or more monovalent elemental anions, $L^{(2)}$ comprises one or more divalent elemental anions, $L^{(3)}$ comprises one or more trivalent elemental anions, and $L^{(4)}$ comprises one or more of tetravalent anions such as $C^{4-}$, wherein $a+b+c=1$ and $a+2b+3c+3d+4e+5f=g+2h+3i+4j$. Preferably, $0.4<(d+e+f)/(a+b+c)\leq 2.5$, $1.8\leq h\leq 5$, $0\leq i\leq 2.2$, $0\leq j\leq 1$. More preferably, $M^{(2)}$ comprises of at least $Ca^{2+}$, $Sr^{2+}$, $Ba^{2+}$ and necessarily includes $Eu^{2+}$; $M^{(4)}$ comprises of at least $Si^{4+}$, $0.4<(d+e+f)/(a+b+c)\leq 2.1$, $0.35\leq e\leq 2.1$, $1.8\leq h\leq 5$, $i=0$, $j=0$. Alternatively, $M^{(2)}$ comprises of at least $Ca^{2+}$, $Sr^{2+}$, $Ba^{2+}$ and necessarily includes $Eu^{2+}$; $1.5<(d+e+f)/(a+b+c)\leq 2.5$, $1.3\leq e\leq 2.5$, $1.8\leq h 4.5$, $0.5\leq i\leq 2.2$, $j=0$; $M^{(4)}$ comprises of at least $Si^{4+}$.

In another general embodiment, the phosphor or luminescent material can have a general formula of $[(Sr_{1-z}M_z)_{1-(x+w)}A_wCe_x]_3(Al_{1-y}Si_y)O_{4+y+3(x-w)}X_{1-y-3(x-w)}$, wherein $0<x\leq 0.10$ and $0\leq y\leq 0.5$, $0\leq z\leq 0.5$, $0\leq w\leq x$, A is Li, Na, K, Rb, or any combinations thereof, M is Ca, Ba, Mg, Zn, or any combinations thereof, and X is a monovalent anion. Preferably, $0<x\leq 0.05$, $0.2\leq y\leq 0.6$, $0.2\leq z\leq 0.6$, A is Li, Na, or any combinations thereof, M is Ca, and X is F. More preferably, $0.0025\leq x\leq 0.02$, $0.3\leq y\leq 0.5$, $0.3\leq z\leq 0.5$, A is Li, Na, or any combinations thereof, M is Ca, and X is F.

The use of a green or blue-green phosphor rather than a green LED is advantageous even though LED chips emitting in the green region of the spectrum (e.g. with a peak wavelength from about 500 to 565 nm) are known in the art. However, LED quantum efficiency is adversely impacted in this wavelength interval, for any known chip chemistry. This is also referred to as "the green abyss" and has resulted in pursuing green phosphor converted LEDs, e.g. made with highly efficient violet chip and highly efficient green phosphor.

It is contemplated that various phosphors which are described in this application in which different elements are enclosed in parentheses and separated by commas, such as $(Sr,Ca)S:Eu^{2+}$ can include any or all of those specified elements in the formulation in any ratio. For example, the phosphor identified above has the same meaning as $(Sr_aCa_{1-a}S):Eu^{2+}$, where a may assume values from 0 to 1, including the values of 0 and 1.

In addition to the above phosphors, the phosphor material can include one or more additional phosphors. When the phosphor material includes a blend of two or more phosphors, the ratio of each of the individual phosphors in the phosphor blends may vary depending on the characteristics of the desired light output. The relative proportions of the individual phosphors in the various embodiment phosphor blends may be adjusted such that when their emissions are blended and combined with any residual emission from the LED chip in the first LED, there is produced visible light of predetermined x and y values on the CIE chromaticity diagram.

This combined light from the first LED will preferably have a region in color space on the CIE 1931 chromaticity diagram bounded by the points having the color coordinates: x=0.171 and y=0.005; x=0.373 and y=0.624; x=0.039 and y=0.812; and x=0.124 and y=0.058. This region is shown on FIG. 6.

Figure 6:
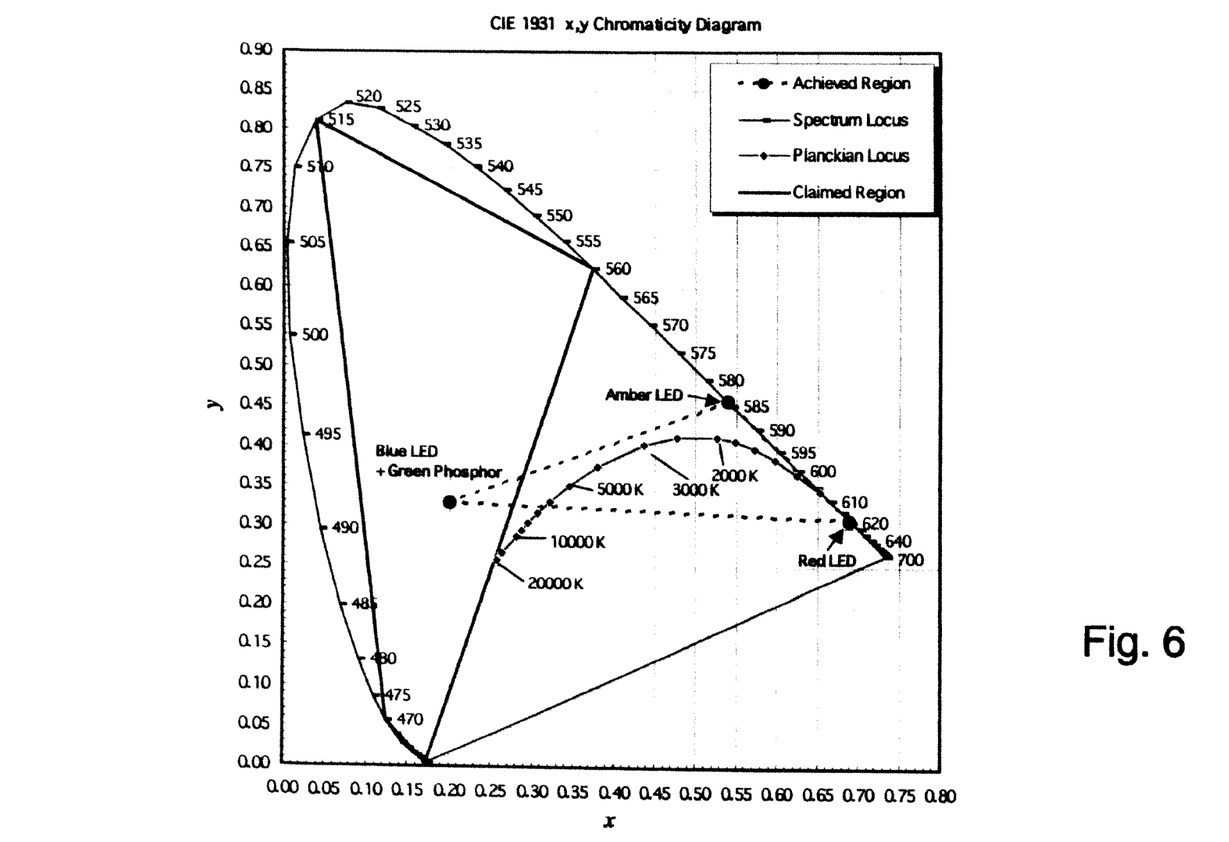
FIG. 6 is a preferred cross sectional diagram of the present invention.

It can be seen that by choosing a first LED incorporating a blue-green or green phosphor material and having a combined emission in the above region, a second LED having a peak emission in the amber region, such as at about 580-590 nm, and a third LED having a peak emission in the red region, such as at about 615-650 nm, the combined emission from these three components can have a color point that spans the Planckian locus at all relevant color temperatures. An example of such a combined emission region is shown in FIG. 6 as noted by the caption "achieved region".

The use of a red LED and an amber LED, the peak emissions of which are separated by at least 25 nm (preferably at least 35-40 nm) solves a long-standing problem stemming from the poor temperature stability of amber and red LED chips when used separately. When used together in the present invention in conjunction with the first phosphor converted LED emitting in the above specified color space, the stability of the device is greatly improved. This is due in part to the fact that the amber LED has a color point above the Planckian locus while the red LED has a color point below the Planckian locus. Thus, the combination of the two covers the Planckian from both above and below, and thereby allows for superior color control using suitable feedback circuitry.

The embodiments described here overcome the problem of prior devices by adding an amber LED to the device, which provides an extra degree of freedom such that the color point region achievable is not a straight line, but a triangle in the color space. As noted, this triangle can cover the Planckian locus throughout the region of interest for general illumination (e.g. 2500 K to 6500 K) and the color point can be controlled and maintained via feedback circuitry at a preset CCT and dbb value combination, all the while providing a combination of high luminous efficacy (higher than 330 lm/Wopt, preferably higher than 350 lm/Wopt) and high CRI (typically 90 or higher).

It may be desirable to add pigments or filters to one or more of the LEDs to absorb or remove emission of any residual LED bleed. When the first LED includes a UV emitting chip, the device may also comprise from 0 up to about 10% by weight (based on the total weight of the phosphors) of a pigment or other UV absorbent material capable of absorbing or reflecting UV or other radiation from the LED.

Suitable pigments or filters include any of those known in the art that are capable of absorbing radiation generated between 200 nm and 450 nm. Such pigments include, for example, nickel titanate or praseodymium zirconate. The pigment may be used in an amount effective to filter 10% to 100% of the radiation generated by the LED.

One can create spectral blends for use in each phosphor material to cover the relevant portions of color space, especially for white lamps. Specific examples of this are shown below. For various desired color points, one can determine the identity and appropriate amounts of each phosphor compound to include in the phosphor material. Thus, one can customize phosphor blends for use in the embodiments to produce almost any CCT or color point, with control over the CRI and luminosity based on the amount of each phosphor in the lighting device.

PROPHETIC EXAMPLES

One

Figure 7:
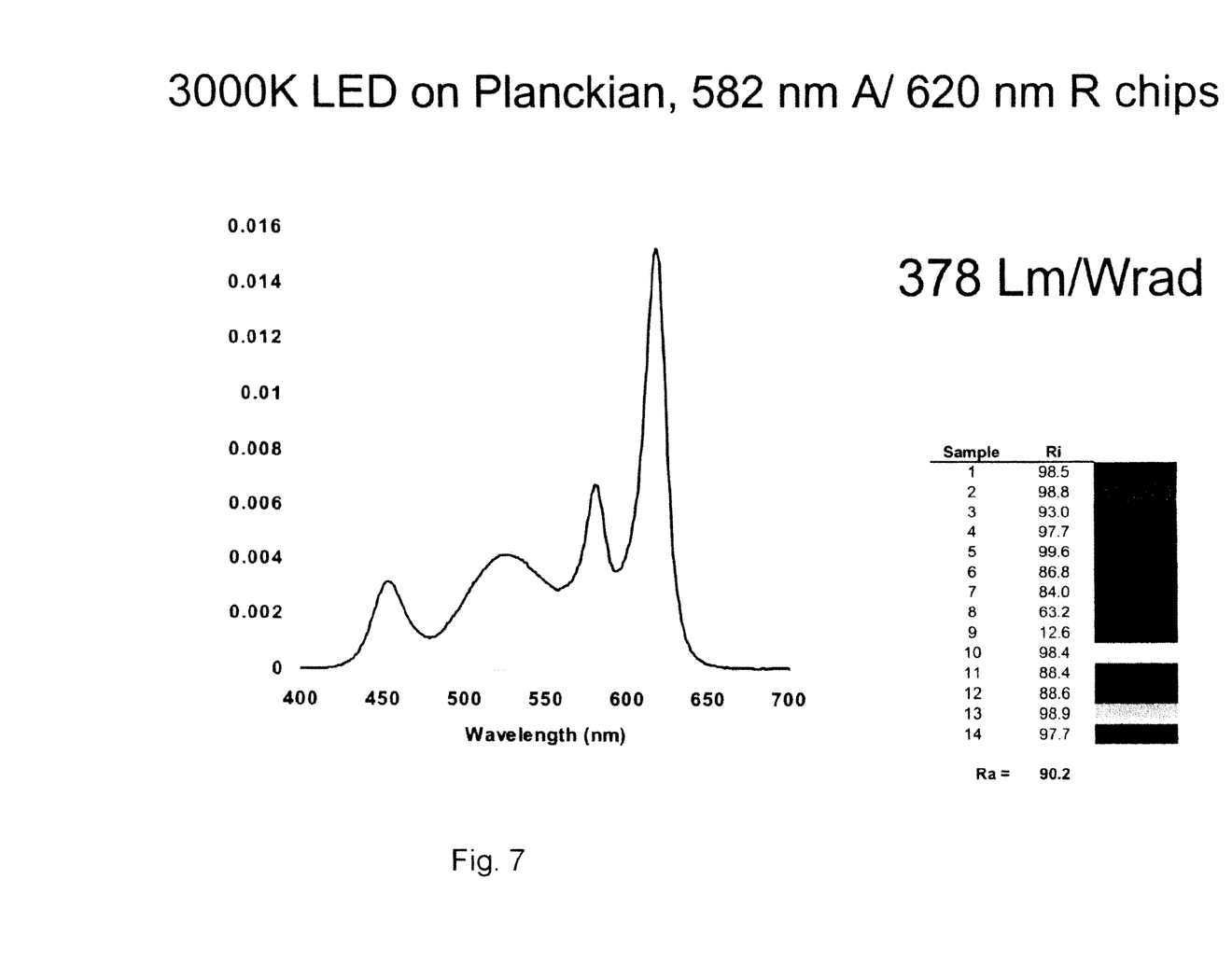
FIG. 7 is emission spectrum of a 3000 K system according to a first embodiment.

A white light emitting device using a red LED having a peak emission at 620 nm, an amber LED having a peak emission at 582 nm, and a phosphor converted LED (phosphor peak emission at 529 nm) including a blue LED chip having a peak emission at 453 nm. The phosphor has the formula $Ba_{2.85}Eu_{0.15}Si_6O_{12}N_2$. The simulated emission spectrum of the white light device is shown in FIG. 7. This spectrum is calculated as having a CRI (Ra) of 90.2 and a luminosity (luminous efficacy) of 378 lm/$W_{rad}$.

Two

Figure 8:
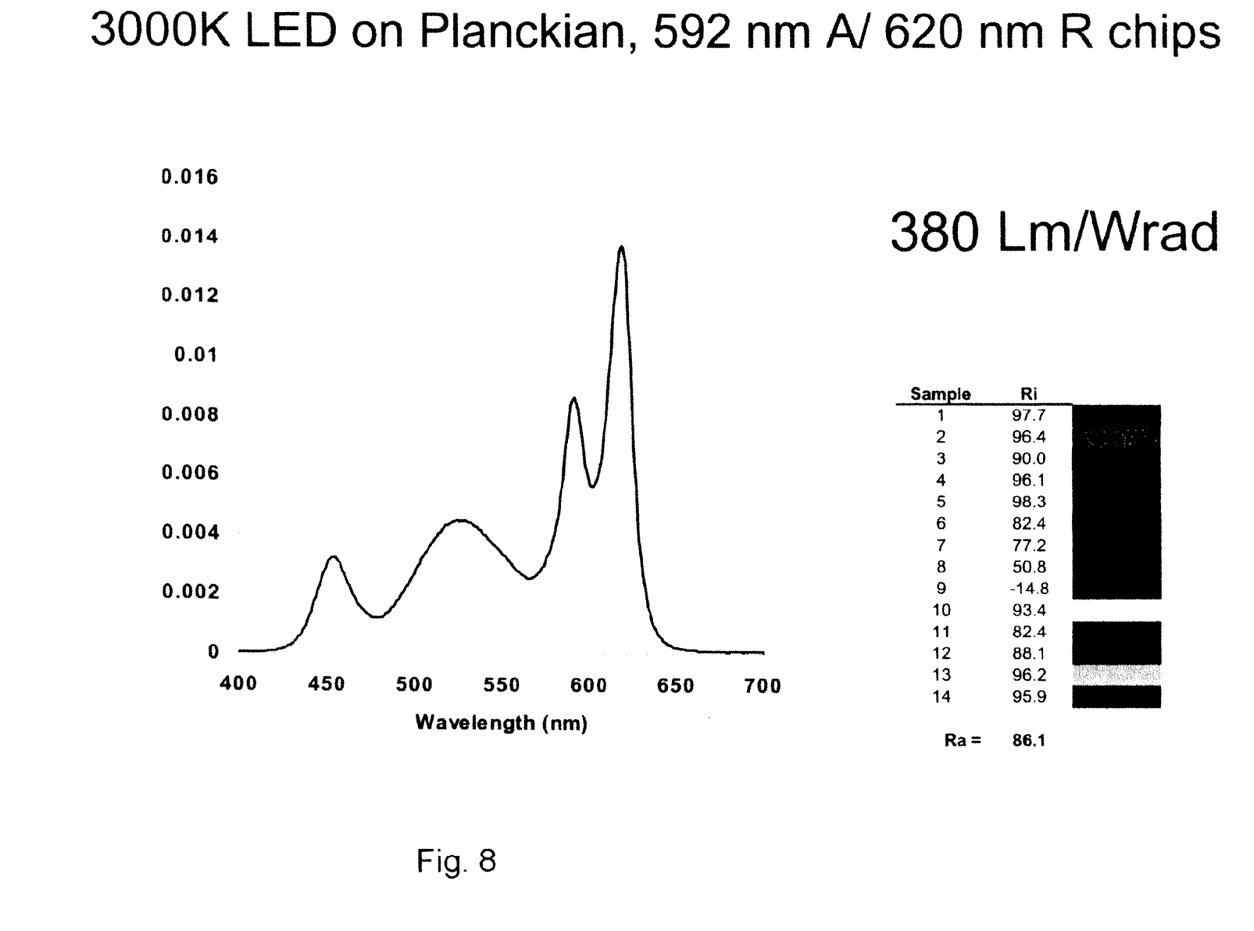
FIG. 8 is an emission spectrum of a 3000 K system according to a second embodiment.

A white light emitting device using a red LED having a peak emission at 620 nm, an amber LED having a peak emission at 592 nm, and a phosphor converted LED (phosphor peak emission at 529 nm) including a blue LED chip having a peak emission at 453 nm. The phosphor has the formula $Ba_{2.85}Eu_{0.15}Si_6O_{12}N_2$. The simulated emission spectrum of the white light device is shown in FIG. 8. This spectrum is calculated as having a CRI (Ra) of 86.1 and a luminosity of 380 lm/$W_{rad}$.

Three

Figure 9:
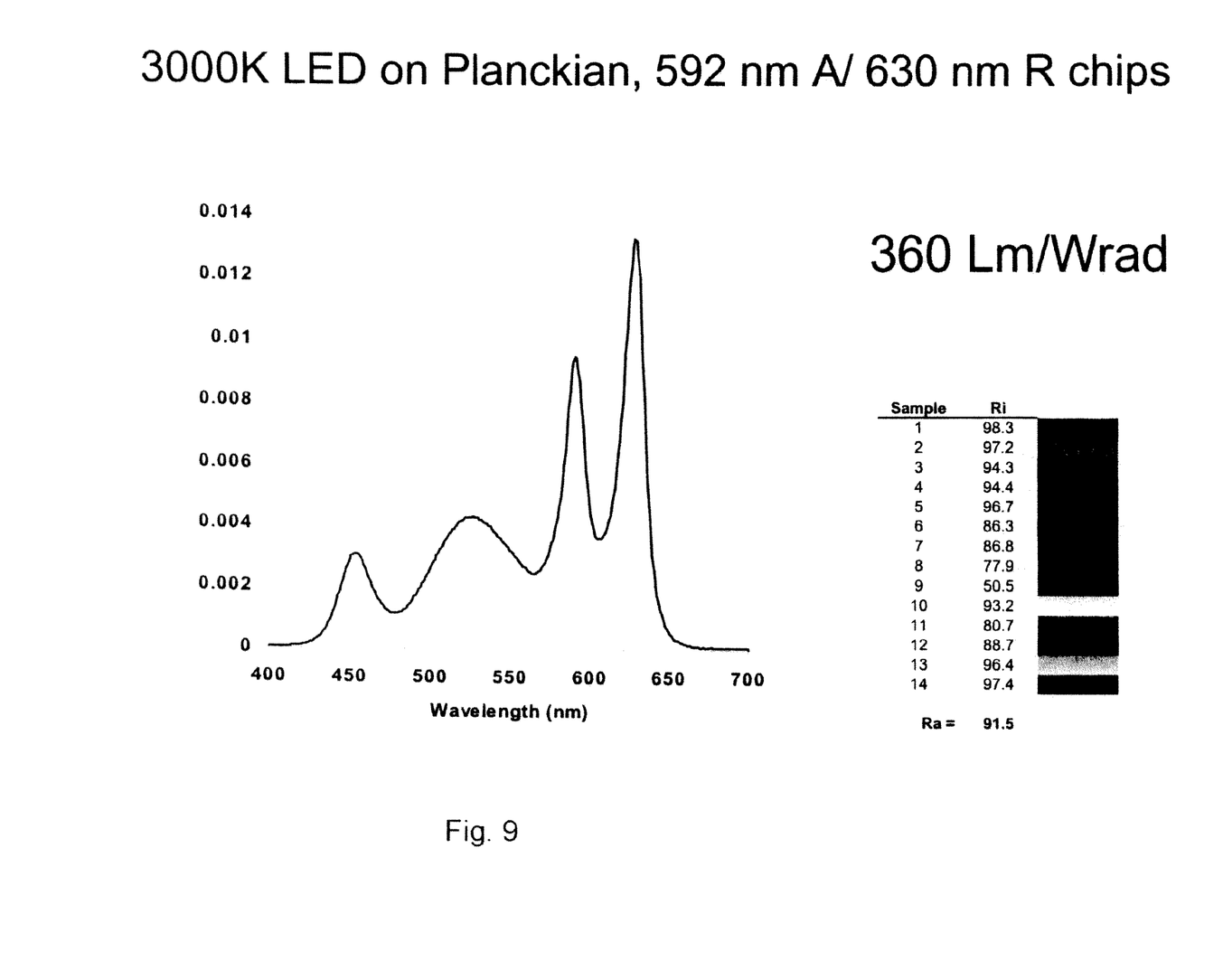
FIG. 9 is an emission spectrum of a 3000 K system according to a third embodiment.

A white light emitting device using a red LED having a peak emission at 630 nm, an amber LED having a peak emission at 592 nm, and a phosphor converted LED (phosphor peak emission at 529 nm) including a blue LED chip having a peak emission at 453 nm. The phosphor has the formula $Ba_{2.85}Eu_{0.15}Si_6O_{12}N_2$. The simulated emission spectrum of the white light device is shown in FIG. 9. This spectrum is calculated as having a CRI (Ra) of 91.5 and a luminosity of 360 lm/$W_{rad}$.

Four

Figure 10:
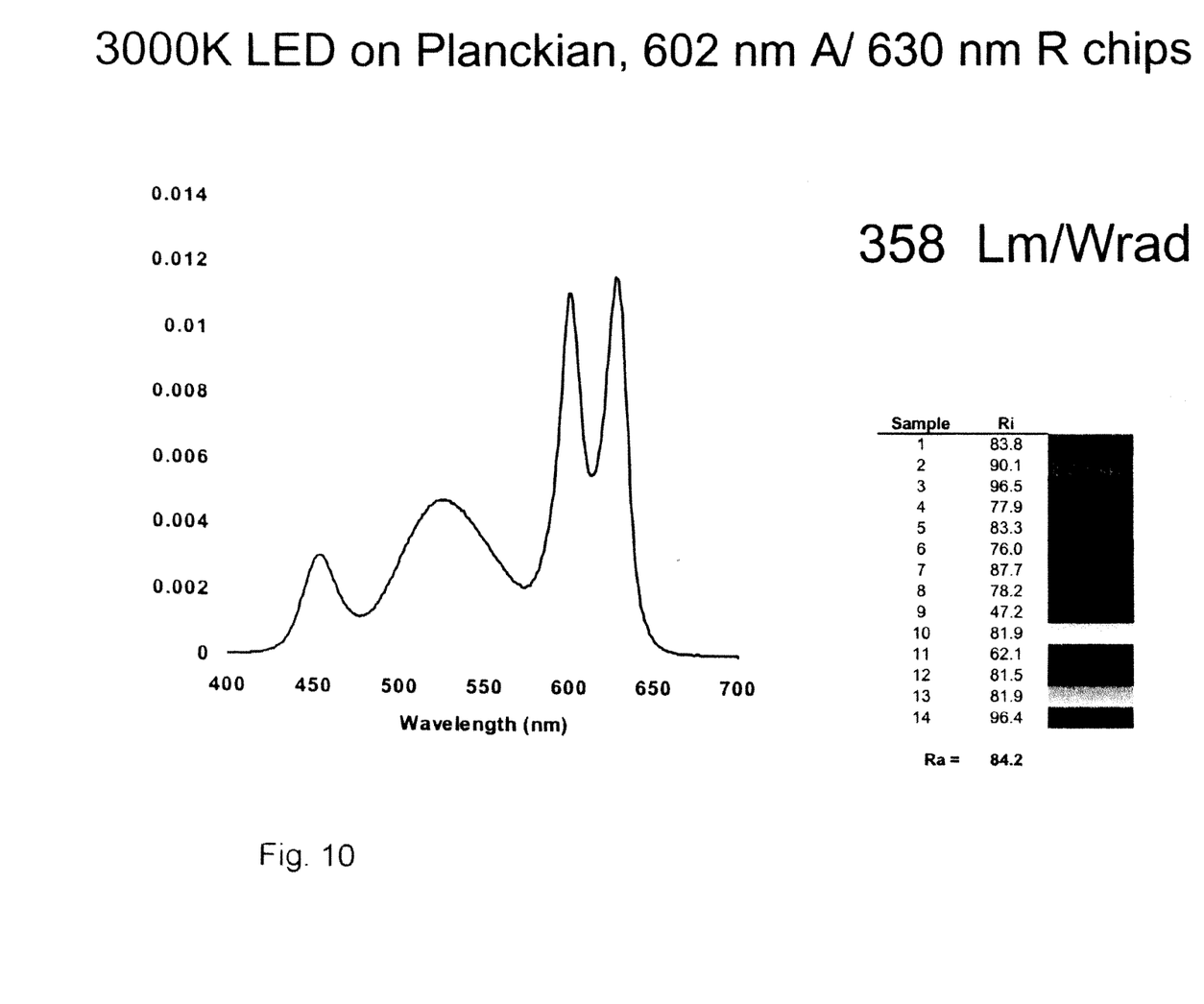
FIG. 10 is an emission spectrum of a 3000 K system according to a fourth embodiment.

A white light emitting device using a red LED having a peak emission at 630 nm, an amber LED having a peak emission at 602 nm, and a phosphor converted LED (phosphor peak emission at 529) including a blue LED chip having a peak emission at 453 nm. The phosphor has the formula $Ba_{2.85}Eu_{0.15}Si_6O_{12}N_2$. The simulated emission spectrum of the white light device is shown in FIG. 10. This spectrum is calculated as having a CRI (Ra) of 84.2 and a luminosity of 358 lm/$W_{rad}$.

Thus, it can be seen how the present invention allows one to easily tune the CCT of a white light device by altering the relative spectral contributions from the different components, all the while maintaining very high luminosity values (330 lm/Wrad or greater, preferably 350 lm/Wrad or greater) as well as very high $R_a$ values (90 or greater).

The invention has been described with reference to the preferred embodiment. Obviously, modifications and alterations will occur to others upon reading and understanding the preceding, detailed description. It is intended that the invention be construed as including all such modifications and alterations insofar as they come within the scope of the appended claims or the equivalents thereof.

What is claimed is:

1. A white light emitting device comprised of a first LED having a peak emission in the range 400 to 480 nm and a phosphor material radiationally coupled to said first LED, said phosphor material comprising a phosphor having a general formula of $[(Sr_{1-z}M_z)_{1(x+w)}A_wCe_x]_3(Al_{1-y}Si_y)O_{4+y+3(x-w)}X_{1-y-3(x-w)}$, wherein $0<x\leq0.10$ and $0\leq y\leq0.5$, $0\leq z\leq0.5$, $0\leq w\leq x$, A is Li, Na, K, Rb, or any combinations thereof, M is Ca, Ba, Mg, Zn, or any combinations thereof, and X is a monovalent anion; a second LED having a peak emission in the range >615; and a third LED having a peak emission in the range of 580 to less than 610 nm and wherein said second LED has a peak emission between 35 and 40 nm greater than said third LED.

2. The white light emitting device of claim 1 wherein: $0<x\leq0.05$, $0.2\leq y\leq0.5$, $0.2\leq z\leq0.5$, A is Li, Na, or any combinations thereof, M is Ca, and X is F.

3. The white light emitting device of claim 1 wherein: $0.0025<x\leq0.02$, $0.3\leq y\leq0.5$, $0.3\leq z\leq0.5$.

4. The white light emitting device of claim 1, wherein the combined light from the first LED will have a region in color space on the CIE 1931 chromaticity diagram bounded by the points having the color coordinates: x=0.171 and y=0.005; x=0.373 and y=0.624; x=0.039 and y=0.812; and x=0.124 and y=0.058.

5. The light emitting device of claim 1, wherein said first LED is a violet to UV emitting LED with a peak emission wavelength between about 400 and 480 nm, and wherein said phosphor material comprises a green emitting phosphor capable of absorbing at least a portion of the radiation emitted from said first LED and emitting light having a peak wavelength in the range of from about 480 to 560 nm.

6. The light emitting device of claim 1, wherein said second LED has a peak emission in the range of about 620 to 640 nm.

7. The light emitting device of claim 1, wherein said third LED has a peak emission in the range of 580 to 600 nm.

8. The light emitting device of claim 1, wherein said device has a CRI of at least 80.

9. The light emitting device of claim 1, wherein said device has a CRI of at least 90.

10. The light emitting device of claim 1, wherein said device has a luminous efficacy of greater than 330 lm/Wrad.

11. The light emitting device of claim 1, wherein said device has a luminous efficacy of greater than 350 lm/Wrad.

* * * * *